United States Patent [19]

Leavitt

[11] Patent Number: 5,169,413
[45] Date of Patent: Dec. 8, 1992

[54] LOW TEMPERATURE PRESSURE SWING ADSORPTION WITH REFRIGERATION

[75] Inventor: Frederick W. Leavitt, North Tonawanda, N.Y.

[73] Assignee: Praxair Technology Inc., Danbury, Conn.

[21] Appl. No.: 772,336

[22] Filed: Oct. 7, 1991

[51] Int. Cl.$^5$ .......................................... B01D 53/04
[52] U.S. Cl. .................................. 55/25; 55/28; 55/31; 55/33; 55/58; 55/62; 55/68; 55/74; 55/75; 55/179; 55/267; 55/387; 55/389
[58] Field of Search ........................... 55/25–28, 55/31, 33, 58, 62, 68, 74, 75, 161–163, 179, 267, 387, 389

[56] References Cited

U.S. PATENT DOCUMENTS

| | | | |
|---|---|---|---|
| 2,223,588 | 12/1940 | Watson et al. | 55/58 X |
| 2,359,660 | 10/1944 | Martin et al. | 55/62 X |
| 2,675,089 | 4/1954 | Kahle | 55/62 |
| 2,790,505 | 4/1957 | Dow | 55/33 |
| 2,910,139 | 10/1959 | Matyear, Jr. | 55/31 X |
| 2,995,208 | 8/1961 | Hachmuth et al. | 55/33 |
| 3,267,645 | 8/1966 | Simonet | 55/179 |
| 3,323,288 | 6/1967 | Cheung et al. | 55/58 |
| 3,355,859 | 12/1967 | Karwat | 55/25 |
| 3,490,205 | 1/1970 | Hauser | 55/179 |
| 3,674,429 | 7/1972 | Collins | 55/31 X |
| 3,712,027 | 1/1973 | Hasz | 55/33 |
| 3,734,293 | 5/1973 | Biskis | 55/179 X |
| 3,850,592 | 11/1974 | Huffman | 55/33 |
| 3,923,477 | 12/1975 | Armond et al. | 55/58 X |
| 3,973,931 | 8/1976 | Collins | 55/58 |
| 4,026,680 | 5/1977 | Collins | 55/26 |
| 4,329,158 | 5/1982 | Sircar | 55/26 |
| 4,472,178 | 9/1984 | Kumar et al. | 55/25 |
| 4,499,208 | 2/1985 | Fuderer | 55/25 X |
| 4,696,681 | 9/1987 | Lloyd-Williams | 55/28 |
| 4,698,073 | 10/1987 | Rohde et al. | 55/33 |
| 4,783,432 | 11/1988 | Settlemyer | 55/25 X |

OTHER PUBLICATIONS

Jun Izumi et al, "High Efficiency Oxygen Separation with the Low Temperature and Low Pressure PSA", Nov., 1989, pp. 1–10, A.I. Ch. E, San Francisco, Calif.

Primary Examiner—Robert Spitzer
Attorney, Agent, or Firm—Alvin H. Fritschler

[57] ABSTRACT

Pressure swing adsorption gas separation operations are enhanced by the retention and use of internal refrigeration effects, without the need for externally supplied refrigeration.

59 Claims, 1 Drawing Sheet

LOW TEMPERATURE PRESSURE SWING ADSORPTION WITH REFRIGERATION

BACKGROUND OF THE INVENTION

1. Field of the Invention

The invention relates to gas separations. More particularly, it relates to the enhanced production of oxygen from air.

2. Description of the Prior Art

Adsorption processes have been widely used for the separation and purification of gases. High surface-area sorbents have an affinity for adsorbing gas molecules on the surface thereof. The quantity of gas adsorbed depends on the specific sorbent employed, on the gas being adsorbed, and on the temperature and pressure conditions under which the adsorption operation is carried out. For most sorbents, the quantity adsorbed increases as the partial pressure of the gas component being adsorbed increases and as the adsorption temperature decreases. Thus, the amount of gas adsorbed can be increased by decreasing the adsorption temperature. In most practical applications, it is necessary to desorb the adsorbed gases so as to regenerate the sorbent to enable the adsorption process to be repeated on a cyclic basis. The desorption step proceeds best at high temperatures and low pressures. For such practical applications, therefore, either the pressure or the temperature, or both, must change or "swing" on a cyclic basis between the adsorption and desorption steps. These two basic approaches for gas separation are called pressure swing adsorption (PSA) and temperature swing adsorption (TSA).

In recent years, PSA processes have been developed for the production of oxygen and nitrogen from air. In such processes, feed air is passed to an adsorption bed containing sorbent capable of selectively adsorbing a more readily adsorbable component from air, i.e. either nitrogen or oxygen, while the less readily adsorbable component is discharged from the adsorption bed. While the behavior of such PSA processes is clearly influenced by the temperature conditions under which adsorption and desorption take place, most PSA processes have been designed to operate under generally ambient temperature conditions without the use of specific means for controlling the temperature conditions pertaining to the adsorption operation.

In PSA systems, heat is liberated upon adsorption, and heat is taken up by the sorbent upon desorption. The temperature of the adsorption bed thus tends to rise during the adsorption step, while the temperature of said bed drops during the desorption step. The temperature change is most pronounced during the portion of the overall PSA cycle in which the adsorption bed is being pressurized to an upper adsorption pressure or is being depressurized to a lower desorption pressure, provided that the adsorbent is essentially free of strongly-adsorbed impurities that can only be desorbed effectively by purging and that act to prevent adsorption of less strongly adsorbed components. Pressurization and depressurization of the open gas spaces in an adsorption system, such as the distributor means or headspaces in vessels used to contain the bed of sorbent material, also causes temperature changes by the reversible work done by compression and expansion of gases therein. In a dynamical process such as the PSA process, much of the heat of adsorption and compression is transferred to the flowing feed gas, e.g. air, stream and is carried out of the adsorption bed. In typical PSA processing, such as that used for the production of oxygen and/or nitrogen from air, the forward flow of gas during adsorption exceeds the backward fl the backward flow of gas during desorption. As a result, there is a net flow forward of enthalpy, which tends to reduce the average temperature of the adsorption beds employed in a PSA system when the temperature oscillations therein are greater than in the region near the entrance to the beds.

The effect of temperature on PSA processes for producing oxygen from air is discussed by Izami et al. "High Efficiency Oxygen Separation with Low Temperature and Low Pressure PSA", AIChE, San Francisco, Calif., November, 1989. Five different molecular sieve type sorbents capable of selectively adsorbing nitrogen from feed air were investigated in the reported study, including Na-X (with two different Si/Al ratios), Ca-A, Ca-X, and Si-X. It was found that the sorbents with alkaline earth cations (Ca and Sr) showed the best $N_2/O_2$ separation factors at near room temperature, whereas the separation factor peaked for the Na-X sorbents at about $-30°$ C. In all cases, the nitrogen storage capabilities increased as the temperature decreased, as would be expected from adsorption theory as discussed above. Bench-scale process tests with Ca-A and Na-X sorbents confirmed that the Ca-A sorbent performed best between 0° C. and room temperature, whereas Na-X sorbent performed best at temperatures well below 0° C. In these tests, the adsorption beds were thermostated and were effectively maintained at a fixed temperature. Larger-scale pilot tests were also performed with Na-X adsorbent material. Cooling coils were incorporated into the bed, and a heat-regenerator section was also employed between a desiccant section used to dry incoming feed air and the adsorbent bed to achieve bed temperatures lower than that of the feed gas stream. Such tests confirmed that the adsorption efficiency was increased, and the cost decreased, when the adsorption temperature was decreased to a nominal value of $-15°$ C. The tests operated more nearly under adiabatic than isothermal conditions, and the temperatures were not uniform. These tests show that it is advantageous to operate the PSA process with Na-X adsorbent at sub-ambient operating temperatures. External refrigeration was used to achieve the desired low adsorbent bed temperature. An optimum desorption pressure of about 0.3 atmospheres was likewise employed.

Contrary to the above, however, others have found that low adsorbent bed temperatures adversely effect PSA system performance. Collins, U.S. Pat. No. 3,973,931, has disclosed that very large axial temperature variations can occur in superatmospheric PSA processes for producing oxygen from air. Temperature variations of more than 50° C. were observed in adsorbent beds of zeolitic molecular sieve material. A very large temperature gradient was found to be established near the feed end of the bed leading to a temperature minimum at a foot or so from the feed end of the bed, with gradually rising temperatures existing throughout the rest of the bed. After repetitive adsorption-desorption cycling, the temperature profile persisted with only slight variation with each cycle. Collins found that these temperature variation conditions were detrimental to the purity and recovery of oxygen using such superatmospheric PSA cycles. As a result, Collins taught that improved operation results from heating the feed air stream by at least 20° F. (11° C.). Although the operating data presented shows that a large axial temperature variation persists, the minimum bed temperature is thereby raised, as are the temperatures throughout the rest of the adsorbent bed. Collins attributes the inlet end temperature depression to an "inadvertent heat regenerative step" and shows that the temperature depression is greatest when water vapor impurity is being adsorbed from the feed stream in this inlet region of the bed. Collins proposes several means for raising the feed stream temperature, including controlling or partially bypassing the feed air compressor aftercooler. The heat of feed air compression is more than adequate to produce the somewhat higher feed air temperatures used for improved processing in accordance with the practice of the teachings of Collins.

The PSA-air separation art thus contains differing teachings as to the choice of adsorbent materials, the pressure levels for adsorption and desorption, and the recommended operating temperature levels, with temperatures both above and below ambient temperatures being recommended. Nevertheless, as indicated above, most commercial PSA-air separation processes are operated under ambient conditions without temperature control and without particular regard to the heat effects that occur during the cyclic adsorption-desorption operations.

There is, of course, a desire in the art to improve PSA operations so as to more fully satisfy the ever-increasing requirements of practical commercial air and other gas separation operations. Such desire in the art relates particularly to enhancing the recovery of oxygen or other desired products with advantageous PSA systems that utilize rather than disregard the heating effects that occur in the course of cyclic PSA operations. For such enhanced operations, however, it is desirable that the PSA systems avoid the use of relatively expensive auxiliary equipment, such as the external refrigeration employed in accordance with the teachings of Izami et al.

It is an object of the invention to provide an improved PSA process and apparatus for the production of oxygen from air, and other desirable gas separations.

It is another object of the invention to provide a PSA gas separation process and apparatus utilizing the heat effects that occur in the course of the cyclic adsorption-desorption PSA sequence so as to avoid the need for external refrigeration.

It is a further object of the invention to provide a PSA process and system for enhancing the overall efficiency and economy of oxygen production from feed air.

With these and other objects in mind, the invention is hereinafter described in detail, the novel features thereof being particularly pointed out in the appended claims.

SUMMARY OF THE INVENTION

The invention comprises a PSA process and system in which means are provided for the controlled retention of internally generated, self-refrigeration so that the average temperature of the adsorbent bed is reduced. The overall efficiency and economy of the air separation process is thereby enhanced.

BRIEF DESCRIPTION OF THE DRAWINGS

The invention is hereinafter further described with reference to the accompanying drawings in which.

DETAILED DESCRIPTION OF THE INVENTION

The objects of the invention are accomplished by operating a PSA process and system at a bed temperature below the ambient, with the required refrigeration being supplied internally without the need for externally supplied refrigeration. By thus retaining and utilizing the internal refrigeration effects of the PSA cycle so that the average temperature of the adsorbent bed is reduced, the overall efficiency and economy of the PSA air or other gas separation operation are enhanced.

The desired high performance oxygen separation from air and other gas separations are obtained, in the practice of the invention, using a PSA system as herein described, incorporating zeolitic molecular sieve adsorbent, e.g. type Na-X, and operated at adsorption/desorption pressure conditions as herein specified. The forward flow of enthalpy exceeds the backward flow thereof, thus creating a net refrigeration that effectively lowers the average temperature of the adsorbent beds. The loss of such refrigeration is precluded by the combination of vessel insulation, the filling of the end spaces in the adsorbent vessels containing the adsorbent beds, and the use of heat-regenerator regions at the feed end of the beds, typically the bottom end, as well as between the desiccant commonly used to dry incoming feed air and the adsorbent beds. Thus, the invention does not require the use of external refrigeration. The amount of self-regenerated refrigeration that is retained can be controlled by the design characteristics of the heat-regenerator regions and the amount of insulation employed. Fine adjustment and control of the average bed temperature is achieved by control of the feed gas, e.g. air temperature, which is accomplished by adjusting the degree of cooling achieved in the compressor aftercooler.

In the equilibrium-type PSA processing achieved using the zeolite molecular sieve adsorbents referred to herein, the more readily adsorbable or heavier component(s) of the feed gas passed to the bed at an upper adsorption pressure are selectively adsorbed and form an adsorption front that passes from the feed end of the bed toward the product end thereof, while the less readily adsorbable or lighter component(s) pass through the bed and are recovered from the product end thereof at the upper adsorption pressure for further processing and/or use downstream. In such equilibrium-type processing, nitrogen comprises the more readily adsorbable component, and oxygen comprises the less readily adsorbable component of feed air. Upon completion of this adsorption step, the bed can, optionally, be cocurrently depressurized to an intermediate pressure level by the release of gas from the product end of the bed, with the released gas being used for pressure equalization with another bed in the system and/or as purge gas for another bed. During this time, the adsorption front of more readily adsorbable component advances further toward the product end of the bed, but without breakthrough therefrom. The bed is then countercurrently depressurized to a lower desorption pressure by release of gas from the feed end of the bed, with or without subsequent purge at said lower desorption pressure level to enhance the desorption and removal of the more readily adsorbable component, e.g. nitrogen in air separation, from the bed. Upon completion of this desorption/purge step, the bed may be partially repressurized to an intermediate pressure by the introduction of oxygen-rich product at the product end of the bed. Subsequently, the bed is repressurized to its upper adsorption pressure as the cyclic PSA processing sequence is continued, with additional quantities of feed air being passed to the bed during each succeeding adsorption step. In a typical PSA cycle of the type described, the forward flow of gas exceeds the backward flow of gas in the bed, resulting in a net flow forward.

The temperature of each adsorbent bed varies with position and time during the cyclic PSA operations. Pressure changes are found to have a dominant effect on the local temperature within the bed. Decreasing the pressure typically decreases the temperature of both the gas in the bed and the adsorbent material. Decreasing the pressure in the open gas spaces in the adsorption vessel also decreases the local gas temperature therein. The decrease in temperature with decreasing pressure causes the average temperature of the backward-flowing low-pressure gas stream to be lower than that of the forward-flowing high pressure gas stream.

For the typical PSA cycles of the type referred herein, it has been found that the forward flow of enthalpy initially exceeds the backward flow of enthalpy, and that there is a net forward flow of enthalpy out of the bed through the product end thereof. While such conditions persist, the bed temperature will tend to decrease until the enthalpy flows balance and a dynamical steady state is established. While it has been found that most systems tend toward a steady state, some instances have been observed where there is an uncontrolled temperature runaway, when suitable means of temperature control are not employed.

Figure 1:
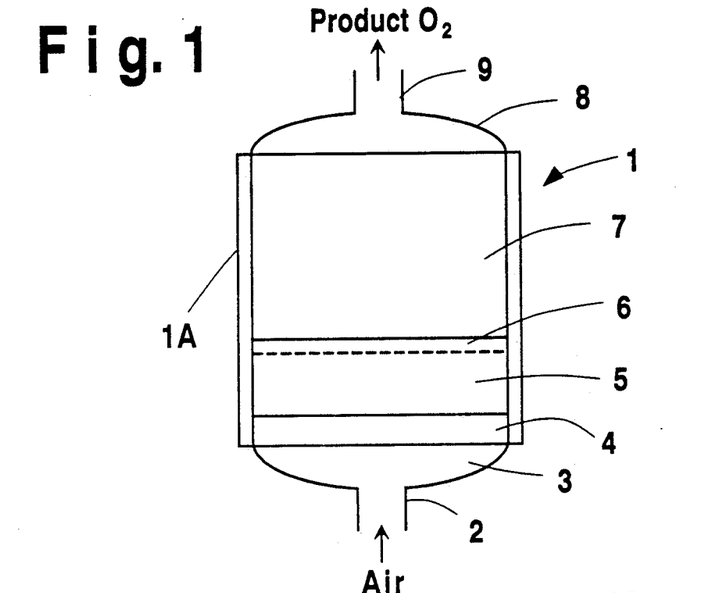
FIG. 1 is a schematic drawing of an embodiment of a self-refrigerating PSA adsorbent bed of the invention.

The local temperature shift in the bed is greatest where the local change in total adsorption of the more readily adsorbable, and some less readily adsorbable component, on the adsorbent is greatest. For the PSA-oxygen process of the invention, the greatest adsorption change is due to the adsorption of nitrogen, and some oxygen, near the feed end of the bed after removal of water vapor and carbon dioxide from the feed air in the drying region of the bed. Upstream of this region of greatest adsorption change in the bed, the adsorption of water vapor and carbon dioxide generates heat and can also cause large temperature changes, but these changes mainly occur in such a way that the forward and backward gas flows have nearly equal average temperatures. However, in order to return the refrigeration produced as a result of desorption in the drying region of the bed, a thermal regenerator zone is positioned at the feed end of the bed upstream of the drying section of the bed, as shown in FIG. 1 of the drawings. In the nitrogen adsorption region, the backflow may be as much as 90% of the forward flow from the feed end of the product of the bed. Such conditions, combined with large differences in the temperatures of the forward and backward flowing gas streams, result in a large depression in local bed temperature. These differences in the thermal behavior of different zones lead eventually to large axial temperature gradients in the beds, enhanced by the regenerators of the invention.

In FIG. 1, a self-refrigerating PSA bed of the invention is shown positioned within an adsorption vessel generally represented by the numeral 1. Said vessel has feed air inlet conduit 2 through which feed air passes to bottom distributor means 3. First thermal regenerator zone 4, which was referred to above, is positioned above said distributor space or means 3 upstream of, i.e., below, drying section 5. The downstream, i.e., upper portion, of said drying section 5 comprises a second thermal regeneration zone 6, as described herein. Adsorbent bed 7 is positioned above said drying section 5 within vessel 1, and is the principal region therein for the desired selective adsorption of nitrogen from air. Above adsorbent bed 7, vessel 1 includes upper distributor space or means 8 and product oxygen discharge conduit 9. Insulated walls 1A are provided for vessel 1 so as, in combination with other elements of the invention, to block the loss of refrigeration from the vessel. Such other elements include the filling of the bottom distributor space as herein provided and the use of one or two thermal regenerator zones in particular embodiments of the invention. One such regenerator zone, as indicated above, is positioned at the feed end of the vessel immediately downstream of the bottom distributor space, and the other comprises the downstream portion of the preliminary drying section, if employed, immediately upstream of the principal adsorbent bed region employed in the desired air separation purposes.

The temperature shift of a bed of zeolitic molecular sieve, e.g., type Na-X material, initially in equilibrium with air, is generally about $-5°$ C. when the bed pressure is changed from 125 kPa to 50 kPa. For pure nitrogen subjected to the same depressurization, the temperature shift would be about $-6°$ C., while for pure oxygen the shift would be only about $-2°$ C. This is expected since nitrogen is more strongly adsorbed and has a higher heat of adsorption than oxygen. For the indicated shift of $-5°$ C., with a backflow of about 90% of the forward flow, the temperature depression has been determined to be about $-45°$ C. This depression will likely occur near the feed end of the nitrogen adsorption zone, i.e., adsorbent bed 7 of FIG. 1, with smaller temperature depressions occurring further downstream in the bed. Thus, a substantial amount of internal refrigeration is generated spontaneously in the course of such transatmospheric PSA processing cycles. Such internally generated refrigeration is found to be even larger for superatmospheric high-pressure PSA cycles, confirming the observations of Collins.

In the illustrative practice of the invention so as to control the retention of internally generated, self-refrigeration and reduce the average temperature of the adsorbent bed, simulations based on adsorption and desorption pressures of 125 and 50 kPa, respectively, were employed for PSA processing operations employing type Na-X zeolitic molecular sieve adsorbent to achieve oxygen production of 15 tons/day at a purity of 93% oxygen.

The insulated PSA vessel comprises, for example, a bottom distributor space of about 6" in height, a 1" regenerator section, an 8" drying section containing desiccant for the removal of water, carbon dioxide, heavy hydrocarbons and the like, a 50" adsorbent section for the selective adsorption of nitrogen from feed air, and a top distributor space of about 7". Conventional insulation about 2" thick was employed to minimize the loss of refrigeration in the vessel. For purposes of the invention, the bottom distributor space or means is filled with 5/16 inch conductive brass spheres to suppress thermal cycling due to work of compression and expansion of the gas therein. The spheres serve to decrease the total gas volume therein by on the order of about 60% so as to directly decrease the work of compression and expansion, and the thermal cycling, by the same amount. In addition, the conductive spheres absorb and release heat from the gas and thus suppress the thermal cycling still further. The increase in nitrogen adsorbent temperature due to the work of compression and expansion in the distributor means is found to be proportional to the product of the distributor means void volume times the pressure swing divided by the net oxygen product rate. Thus, the distributor means void volume should be kept low compared to net product flow rate, especially when the difference between adsorption pressure and desorption pressure is large.

The first or lower regenerator section is filled with 10×12 mesh copper spheres contained between separator screens to prevent loss of the spheres or the intrusion therein of adsorbent particles from the adsorbent bed section of the vessel. This regenerator section is adapted to pick up low level refrigeration from the downflowing gas streams and to release such refrigeration to the upflowing gas streams. It is needed when the drying section must handle high concentrations of water and other contaminants of feed air that have high heats of adsorption, and when no drying section is employed. This regenerator section is also needed if the desiccant used in the drying section can adsorb significant amounts of nitrogen or oxygen/argon from the feed air stream.

As indicated above, the desiccant layer is needed to remove strongly adsorbed impurities, such as water vapor, carbon dioxide and heavy hydrocarbons, before they reach the nitrogen adsorbent region of the adsorbent vessel. Such impurities are more difficult than nitrogen to desorb from the nitrogen selective adsorbent and would, as a result, lower performance of the PSA system. In addition, such impurities would decrease the thermal cycling in the nitrogen adsorbent region and would, as a result, decrease the self-refrigeration effects desired in the practice of the invention. On the other hand, the desiccant should not adsorb significant amounts of nitrogen, oxygen or argon, as such undesired adsorption would hurt the performance of the desiccant layer. In typical practice, the desiccant layer will mainly operate near the temperature of the feed air stream, i.e., higher than the temperature of the nitrogen adsorbent region.

If the desiccant employed is alumina or another relatively heavy adsorbent material, the desiccant particles employed may be smaller than those used for the nitrogen selective adsorbent since they will not be so easily lifted and fluidized by the upflow streams.

No separate second regenerator section is needed between the desiccant layer and the sorbent bed, when the first regenerator section is performing well, since the top portion of the desiccant layer itself will act as a sufficient regenerator section, while also acting to complete the removal of the strongly-adsorbed impurities.

The nitrogen selective adsorbent region is filled with 8×12 mesh beds of sodium X zeolite having a silica/alumina ratio of about 2.0, with less than 5 g/kg water loading.

The top distributor means is packed with spheres or other objects to reduce compression energy loss, but there is no need to reduce thermal cycling at said top distributor means. Such thermal cycling does not significantly interfere with self-refrigeration of the nitrogen adsorbent region of the vessel. It should also be noted that no regenerator is needed between the top distributor space and the nitrogen adsorbent region since little heat will be conducted downward into the nitrogen adsorbent region from the top distributor space in any event.

Since the major drop in temperature occurs between the desiccant layer and the nitrogen adsorbent region that must operate at low temperature, it may not be readily apparent why, in the practice of the invention, a first regenerator section is positioned in the vessel below the desiccant layer. The reason for locating said first regenerator section below the desiccant layer is to prevent heat of adsorption of water from pumping heat into and through the desiccant layer and thence into the nitrogen adsorbent region. Water adsorbed at high concentration from the air feed entering the desiccant layer causes a temperature rise at the bottom end of said desiccant layer. The feed air flow picks up the heat as enthalpy and carries it a short distance upward. During the low pressure downward flow steps of the overall PSA cycle, desorption of the water refrigerates the bottom end of the desiccant layer and refrigerates the down flowing gas. The gas carries the refrigeration a short distance downward. The heating and refrigerating effects are equal when the process reaches steady-state. Since much of the refrigeration occurs at the entrance to the desiccant layer, however, some of the refrigeration leaves the desiccant layer during each PSA processing cycle. This refrigeration would be lost with the waste gas leaving the adsorption vessel, except for the placement of the first refrigeration section to adsorb it from the waste gas and store it for advantageous use in the practice of the invention. The first regeneration section is designed to store the refrigeration and then return it to the desiccant layer during the next gas upflow step of the PSA cycle. When this is carried out, the water adsorption heat is balanced by the recovered refrigeration and said adsorption heat does not move upward through the desiccant layer to the nitrogen adsorption region of the vessel.

The upper end of the desiccant layer will be understood to handle only low concentrations of water or other strongly-adsorbed impurities and thus will simultaneously act as an efficient second regenerator section. As a regenerator, it will readily recover the refrigeration generated by the nitrogen region and will transfer this refrigeration to the feed gas stream flowing upward into that region of the vessel during the next portion of the cyclic processing operation.

In the teaching of Izami et al. referred to above, a regenerator region is placed only between the desiccant layer and the nitrogen adsorption region. This is much less effective than the arrangement of the invention since refrigeration generated in the desiccant layer will be at least partially lost and this loss will result in higher temperatures in the nitrogen adsorption region regardless of the regenerator efficiency. Furthermore, as indicated above, the upper end of the desiccant layer acts simultaneously to remove traces of strongly adsorbed impurities and to serve as a regenerator. The two uses of the desiccant layer do not conflict with one another, but, instead, provide a highly desirable synergy for more efficient PSA process and system operation.

In filling the bottom distributor means of the adsorption vessel to appreciably decrease the void space therein, it is important that the particles employed, such as the conductive particles referred to above, be large enough to avoid creating large pressure drops that would add significantly to the total adsorber pressure drop or cause flow maldistribution through significant lateral pressure gradients in the end space.

It will be understood that conductive elements other than the 10×12 mesh size copper spheres referred to above can be used in the first or lower regenerator section. Preferably, the regenerator is filled with conductive elements comprising metal particles of somewhat lower thermal conductivity than copper. For instance, materials having a conductivity of from about one half to about 1/10 that of copper, are desirable, so that axial conductivity is reduced without excessive reduction of gas-to-solid thermal exchange efficiency. Any significant further reduction in thermal conductivity of the material comprising said first regenerator section would serve to reduce regenerator performance and would require some increase in the depth of said first regenerator section. For purposes of the invention, the conductivity of the material comprising the first regenerator should be such as, together with the amount and size of such material employed, to enable the refrigeration in the back-flowing stream to be stored during the desorption portion of the processing sequence carried out in the adsorbent bed. Such conductivity will desirably be from about 250 to about 0.5, preferably from about 150 to about 15, BTU per °F./ft/ft$^2$/hr. Aluminum, steel and cast iron are suitable materials for this purpose, as well as copper as noted above. Loosely packed regenerator particles should be sized to avoid fluidization during upflow of gas, or to avoid horizontal movement during horizontal gas flow. The particles can be made at least the same size and density as the size and density of the particles used in the adsorbent section. Regenerators in the form of screens, grids and similar structures are not subject to such fluidization and can thus be subjected to greater forces without undue movement.

It is within the scope of the invention to employ regenerator sections other than the axial-flow cylindrical section referred to above. For example, screen stacks can be used, and, if desired, can be separated by thin layers of spheres or other particles with low or moderate thermal conductivity. The regenerator material need not be spheres and can be composed of pellets, irregular particles, fiber mats, porous plates, or particles formed into porous structures by sintering or bonding. In a radial flow adsorption system the regenerator can be in the general form of a cylindrical layer separating the feed-end distributor means, whether external or internal.

A first regenerator made of common plate-and-fin cores is not desirable in the practice of the invention because of the increased axial conduction resulting therefrom. The first regenerator should, in any case, have moderately low void space volume in order to avoid thermal cycling due to the existence of reversible work of compression and expansion in the regenerator itself. As indicated above, the positioning of the first regenerator below the desiccant layer is an important feature of the invention, and is of particular significance when the water content of the feed air is high.

The invention will be understood to involve the use of sodium X zeolite not limited to the embodiment having a silica/alumina ratio of about 2.0 referred to in the illustrative example above. It is within the scope of the invention to employ sodium X zeolites having silica/alumina ratios of from about 2.0 to about 2.6, preferably less than about 2.4, e.g. 2.0 to 2.4. The water loading of the sodium X zeolite used as adsorbent in the practice of the invention should be less than about 25 g. water per kg, preferably less than about 10 g. water per kg., more preferably less than 3 g. per kg. It is also within the scope of the invention to employ a type 5A or 4A zeolite. Such adsorbents are only moderately strong nitrogen selective equilibrium type adsorbents. Strong nitrogen-selective equilibrium type adsorbents prepared by ion-exchange of sodium X zeolites, such as lithium X and calcium X, should not be used in the low temperature region of the adsorbent beds, since the desorption of nitrogen from such adsorbents becomes difficult at the lower temperatures reached by self-refrigerated cycles. However, such strong nitrogen selective adsorbents can be advantageously used in the higher temperature regions near the product end of the bed. Rate selective adsorbents, such as carbon adsorbents that selectively adsorb oxygen instead of nitrogen on a rate selective basis, also should not be used since it is more difficult to generate the needed self-refrigeration in efficient air separation cycles using such adsorbents.

It should be noted that, ordinarily, feed air to be separated in the practice of the invention contains water vapor, carbon dioxide, and other strongly-adsorbed impurities that are removed by the desiccant layer. If, on the other hand, the feed air is free of these impurities, the desiccant layer may be omitted. In such event, all other elements of the PSA system of the invention would still be employed as described above and as shown in FIG. 1, including the first regenerator section positioned above the bottom distributor means. Such elements would still be sized as indicated above for the illustrative example. In this case, the first regenerator section would serve to perform the regenerative function of the top portion of the desiccant layer, and would thus block or preclude the loss of desired refrigeration from the nitrogen adsorbent region of the vessel into the bottom distributor means.

Figure 2:
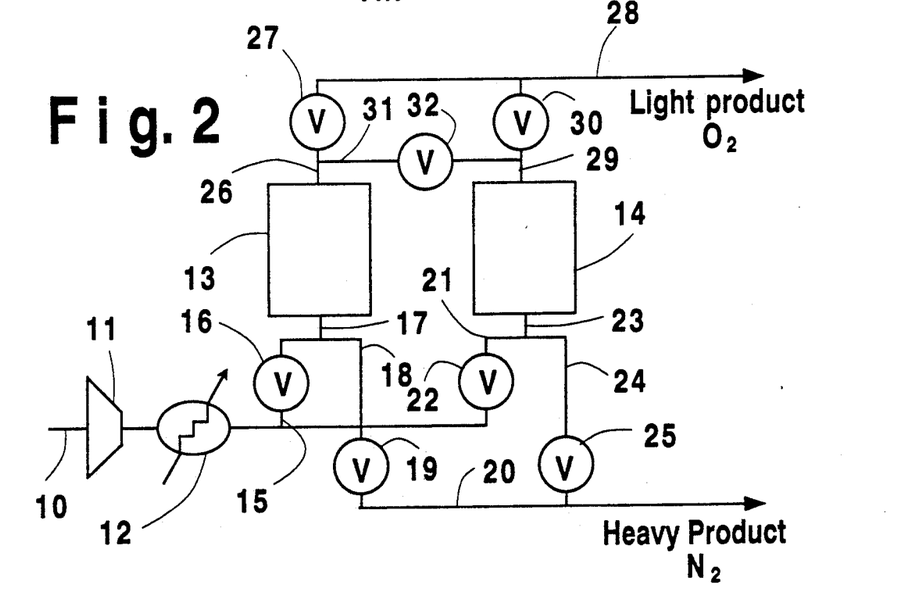
FIG. 2 is a process flow diagram of a typical two bed PSA system.

The invention may be practical in PSA systems having one or more adsorbent beds, with from 2 to 4 bed systems being generally preferred, although systems having a greater number of beds, up to 10 to 12 beds or more, can also be employed. FIG. 2 illustrates a normal 2-bed PSA system used for the desired air separation to produce oxygen product. In this embodiment, feed air in line 10 is compressed in air compressor 11 and passes to aftercooler 12 for cooling prior to passage to either adsorbent bed 13 or adsorbent bed 14 depending upon the portion of the overall PSA processing sequence being carried out in the beds at any given time in the overall cycle. Line 15 containing valve means 16 is adapted to pass feed air to line 17 for passage to the feed or bottom end of bed 13. Line 17 is also connected to line 18, containing valve means 19, for the withdrawal of waste nitrogen from said bed 13 for passage to line 20 for discharge from the system. Similarly, line 21 containing valve means 22 is provided for the passage of feed air to line 23 for introduction into the bottom end of bed 14. Line 24 containing valve means 25 is adapted to pass waste nitrogen gas to said line 20 for discharge from the system. It will be understood that said waste nitrogen stream comprises the more readily adsorbable nitrogen component desorbed and removed from the bed during the lower pressure desorption step of the process.

At the upper end of bed 13, line 26 containing valve means 27 is adapted to pass the less readily adsorbable component of feed air, i.e. oxygen, removed from the upper portion of bed 13 to line 28 for recovery as the desired oxygen product of the air separation process. Likewise, line 29 containing valve means 30 is provided to similarly pass less readily adsorbable oxygen from the upper portion of bed 14 to said line 28 for recovery as said oxygen product gas. It will be noted that line 31 containing valve means 32 is adapted to provide fluid communication between lines 26 and 29 so as to enable gas being passed from the upper portion of one bed undergoing depressurization from its upper adsorption pressure to be passed to the other bed initially at lower pressure for pressure equalization between the beds so that the pressure requirements of the upper pressure adsorption-lower pressure desorption cyclic sequence in each bed can be minimized.

In very large size PSA air separation plants, several adsorbent beds may be connected for parallel flow in one processing bank. All of the beds will then go through the same processing sequence together and simultaneously. Each separate bed in a particular bank desirably shares common feed and exit piping with suitable controls to level the flow among the beds. Such an adsorption bank can contain any number of adsorption beds, but each bank in a given PSA adsorption system would contain the same number of beds as in the other associated banks. Any convenient number of banks may be used in a PSA system, with two and four banks being generally preferred.

It will be appreciated that the invention can be practiced using various modifications of the basic adsorption-desorption-repressurization processing sequence depending upon the overall requirements of any particular air separation operation. One particular processing sequence is described below. It will be understood that each bed of the PSA undergoing this particular processing sequence, or any other such sequence, is of the configuration described above with respect to FIG. 1, unless the desiccant layer can be omitted as indicated above. Thus, all of the beds are adapted for self-refrigerating, low temperature operation, with no external source of refrigeration being employed to achieve the desired low temperature operation.

Processing Cycle Sequence

Step 1—Pressurize the bed to the upper adsorption pressure by the introduction of feed air to the feed end of the bed;

Step 2—Adsorption at the upper adsorption pressure, with feed air being introduced to the feed end of the bed and with less selectively adsorbable oxygen being withdrawn from the product end of the bed as the desired product gas;

Step 3—Cocurrent depressurization with release of void space gas from the product end of the bed to lower the pressure of the bed to an intermediate level, with the released gas being introduced to another bed in the system for use as purge gas or for pressure equalization with a bed initially at lower pressure, or with said released gas being recovered as a secondary oxygen-rich product;

Step 4—Countercurrent depressurization with release of gas from the feed end of the bed, which is depressurized to the lower desorption pressure, said released gas comprising oxygen-lean waste gas;

Step 5—Purge at the lower desorption pressure with oxygen-rich reflux gas from another bed being introduced to the product end of the bed and additional quantities of oxygen-lean waste gas being removed from the feed end of the bed; and Step 6—Partially repressurize the bed by introducing gas released from the product end of another bed to the product end of the bed being repressurized, said bed being repressurized having its pressure increased from the lower desorption pressure to an intermediate pressure prior to further repressurization to the upper adsorption pressure as the processing sequence is continued on a cyclic basis in each bed in the PSA system.

It will be understood that the oxygen-rich reflux gas removed from the product end of the bed in Step 3 and used for purge and/or pressure equalization purposes can be passed directly to another bed in the system for such purposes and/or can be stored in a separate storage vessel for such use. In one embodiment, gas released from a bed upon cocurrent depressurization thereof can be used initially for pressure equalization purposes, either partially or fully, with additional quantities of gas so released being used to pressurize a storage vessel for use in providing purge to another bed in the system at a later time, with still additional quantities of gas being used directly to purge a different bed in the system.

In the practice of the invention utilizing PSA vessels as described in the illustrative vessel example referred to above, with gas being released in cocurrent depressurization Step 3 for pressure equalization and provide purge gas purposes in a two-bed system, a total cycle time of 90 seconds is employed, with the individual processing step times being as follows: Step 1-12 seconds, Step 2-28 seconds, Step 3-5 seconds, Step 4-32 seconds, Step 5-8 seconds and Step 6-5 seconds. The upper adsorption pressure is 150 kPa, the lower desorption pressure is 50 kPa, the pressure equalization decrease in pressure is to 110 kPa and the pressure equalization increase in pressure is to 85 kPa. Feed air is introduced at upper adsorption pressure at the rate of 0.133 moles/second at 300° K., with 0.039 moles/second of oxygen being produced per cycle, with 0.021 moles/second being recovered as oxygen product of 95% purity and with 0.010 moles/second being used as purge oxygen. The desiccant layer is at about 300° K., while the lower, feed end of the nitrogen adsorbent region is at about 270° K. as a result of the self-refrigeration feature of the invention, and the upper, product end thereof is at about 298° K. The total refrigeration per unit of frontal area is about 7,580 W/m$^2$, i.e. 79.8 kw for a bed 12 ft. in diameter. With two inch thick insulation of the nitrogen adsorbent region in accordance with the invention, and with the lateral area of the vessel wall being 21 m$^2$, the heat loss through the wall of the nitrogen adsorbent region was kept to only 1.1 kw, with the corresponding effect on the temperature being only 0.4° K.

It will be understood that various changes and modifications can be made in the details of the invention as described herein without departing from the scope of the invention as set forth in the appended claims. Thus, the desiccant layer may comprise, in addition to the alumina referred to above, silica gel, molecular sieve material, such as certain NaX materials having as high Si/Al ratio, e.g. 20/1, and the like.

The purpose of the insulation on the lateral walls of the adsorbent vessel, i.e. in the region of the regenerator, drying and adsorbent sections, is to prevent undesired loss of self-refrigeration through the lateral walls. For adsorption systems in which the adsorbent beds are in cylindrical vessels and the gas flows are axial, the lateral walls consist of the cylindrical shell. If external insulation is employed, it may be necessary to insulate not only the cylindrical shell, but parts of the vessel distributor spaces as well so as to preclude heat conduction from said spaces to the shell wall. If the adsorbent bed is adapted for radial, rather than axial flow, the top and bottom surfaces would desirably be insulated. It will be understood that the insulation employed for such cylindrical vessels, or for any other vessels, should be of sufficient thickness and low conductivity so that the total heat conduction into the adsorbent vessel through the walls is a very minor fraction of the self-refrigeration generated during the cyclic PSA operations of the invention. The heat conduction into the vessel is thus minimized by the use of insulation, with said heat conduction being less than about 5%, preferably less than about 2%, e.g. between about 1% or less and about 2%, of the self-refrigeration generated within the vessel. It will be understood that any suitable, commercially available insulation material can be employed. Thus, readily available vacuum insulation, pipe insulation or the like can be employed, with insulation materials such as diatomaceous earth, silica and the like being conveniently employed.

For an axial flow adsorber of the type shown in FIG. 1, the regenerator is conveniently in the form of a flat layer at the feed end of the adsorber. In a radial-flow adsorber in which the gas flow is either outward from the center, or inward from the periphery to the center, the regenerator will typically be in the form of a cylindrical layer separating the feed-end distributor means, whether external or internal, from the adsorbent section, with the gas streams thus flowing radially through the regenerator.

In addition to the 5/16" conductive brass spheres used to fill the bottom distributor means in the illustrative example above, other suitable particles, including conductive particles, such as alumina, can be employed for such purpose. During pressurization, the gas in the distributor space is heated by reversible work of compression. Heated gas is then driven through the regenerator and into the adsorbent bed. Eventually, the gas in the distributor space approaches the temperature of the feed gas leaving the feed compressor and its aftercooler. By this point, the excess heat has entered the adsorber. During desorption, the gas in the distributor space is cooled by reversible work of expansion. Cooled gas leaves through exit piping and the vacuum pump, if employed. Eventually, the gas in the distributor space approaches the temperature of the gas leaving the warm end of the regenerator. This temperature is nearly the same as the temperature of the gas that left the feed compressor and its aftercooler, so long as the regeneration is working effectively.

The net effect of the process is that reversible work of compression and expansion in the endspace act as a heat pump. The heat from the pumping is injected into the adsorbent, nullifying at least part of the adsorbent self-refrigeration. The heat pumped into the adsorbent bed migrates through the entire bed, cycle-by-cycle, eventually raising the temperature of the entire bed. Such undesired heat pumping into the feed-end distributor means can be reduced by reducing the distributor space volume and/or by partially filling the distributor space with rigid or bulky particles or structures, such as the brass spheres referred to above, that reduce the gas-filled void space. The residual void space of the distributor space is conveniently about 40% of the volume of the unfilled distributor space, although it will be appreciated that the residual volume can be reduced to any such volume that provides an effective reduction in the heat pumping at the feed end distributor means or space. If the distributor space filling particles or structures have enough heat capacitance and heat transfer surface, they can reduce the heat pumping effect not only by reducing the gas-filled volume, but also by damping the temperature swings of heat conduction with the gas therein. Thus, they can absorb heat from the gas during pressurization and release said heat to the gas during depressurization.

Although heat pumping also occurs in the product-end distributor means at the opposite end of the adsorber, it does not significantly affect the adsorber temperature. While the distributor means is desirably filled with said particles or structures in preferred embodiments of the invention, there is no need to reduce thermal cycling at said product-end distributor space. Said product-end, or top, distributor space may nevertheless be filled with ceramic spheres, or other particles or structures, if desired to reduce compression energy loss in said product-end distributor space.

Those skilled in the art will appreciate that the invention can be practiced using a variety of processing conditions, depending on the gas separation being carried out, the number of adsorbent beds and the adsorbent employed, the desired product characteristics and the like. It is within the scope of the invention to employ lower desorption pressures of from about 0.4 to about 1.2 atmospheres (atm) in various embodiments of the invention. The upper adsorption pressure/lower desorption pressure ratio for purposes of the invention is in the range of from about 1.25 to about 5.0. Within such operating ranges, it should be noted that the invention is desirably practiced within two separate operating regimes. Thus, the invention is advantageously employed, in certain embodiments, at lower desorption pressures of from about 0.4 to about 0.7 atm., e.g. 0.55 atm, with the upper adsorption pressure/lower desorption pressure ratio ranging from about 1.4/1 to about 5.0/1, preferably from about 1.7/1 to about 3.0/1. In other embodiments, the invention is advantageously employed at lower desorption pressures of from about 1.0 to about 1.2 atm., with the upper adsorption pressure/lower desorption pressure ratio ranging from about 1.25/1 to about 3.5/1, preferably from about 1.4/1 to about 2.5/1. In PSA cycles in which each bed is depressured to an intermediate pressure level prior to depressurization to the lower desorption pressure, e.g. by the cocurrent depressurization step referred to above, the difference between the upper adsorption pressure and the intermediate pressure level, or levels if more than one intermediate level is employed, will desirably range from near 0% to as low as about 40% of the total difference between the upper adsorption pressure and the lower desorption pressure employed. The air or other gas feed temperature is conveniently in the range of from about 280° K. to about 310° K., typically from about 290° K. to about 305° K., with ambient temperature conditions being convenient.

As indicated above, the adsorbents employed in the practice of the invention are equilibrium type, sodium X zeolitic molecular sieves that are only moderately strong adsorbents for the more readily adsorbable component of the gas mixture, e.g. for nitrogen in air separation operations. Such adsorbents, for example, the NaX having a silica/alumina ratio as indicated above, and the well known types 5A and 4A materials, thus exhibit only moderate nitrogen or other more selectively adsorbable component selectivity, adsorbent loading, and heat of adsorption. By contrast, LiX, CaX and other zeolites prepared by the ion-exchange of sodium X zeolites are strongly adsorbent with respect to nitrogen or the other more readily adsorbable components of the feed air or other gas, and exhibit high selectivity for nitrogen or other more selectively adsorbable component, together with high loading and high heat of adsorption characteristics.

In embodiments of the invention in which a purge step is employed, as in other PSA cycles, it will be understood that the adsorption front of the more selectively adsorbable component moves from the feed end of the bed toward the product end of the bed during the high pressure adsorption and cocurrent depressurization steps but without breakthrough from the product end thereof. The amount of purge gas employed at the lower desorption pressure is such as to facilitate desorption and removal of said more selectively adsorbable component from the feed end of the bed without breakthrough of the less readily adsorbable component, i.e. oxygen in air separation applications, from the feed end of the bed. At lower adsorption/desorption pressure ratio applications, it is generally desirable to employ sufficient purge gas to assure desorption and removal of the more readily adsorbable component of the bed to the extent possible without said breakthrough of the less readily adsorbable component.

While the invention has been described particularly with respect to PSA air separation operations for the selective adsorption of nitrogen and the recovery of less readily adsorbable oxygen, or oxygen and argon, as the desired product, other gas separation operations can be advantageously carried out in the practice of the invention. It should be understood that air separation PSA cycles are known and can be used in conjunction with the invention whereby the more selectively adsorbable component, i.e. nitrogen, is the desired product and is recovered in the desorption portion of the PSA cycle, with or without the use of a purge step. Other gas separations PSA operations that can be enhanced by the invention include the separation of nitrogen from helium or from hydrogen, with nitrogen being the more readily adsorbable component of such gas mixtures.

Using the system referred to in the illustrative example above for air separation and oxygen recovery, it was determined that performance comparable to that obtained in the external refrigeration approach can be achieved, in the practice of the invention, without the need for external refrigeration. It was also determined that the product recovery is higher, and the bed size factor is desirably lower, when the desorption pressure is kept low under fixed upper adsorption pressure conditions. But, however, increasingly low desorption pressures increase the power requirements for the vacuum pump employed to achieve the vacuum desorption pressure levels. Thus, a modest desorption pressure level and a modestly high adsorption/desorption pressure ratio within the ranges specified above are generally desirable. The invention also provides highly desirable processing flexibility, enabling trade-offs of operating features to be made in light of the requirements or limitations pertaining to a given application.

The invention provides a highly desirable advance in the PSA art, based on the effective utilization of the self-refrigeration generated in the course of cyclic PSA operations. As a result, enhanced gas separations can be achieved, as in the highly desirable PSA operations for the recovery of oxygen by air separation, under optimal temperature conditions without the need and expense of external sources of refrigeration. By the practice of the invention, PSA technology is able to more fully satisfy the need and desire in the art for overall efficiency and economy is satisfying ever increasing demands for air separation for oxygen production and other desirable gas separation operations.

I claim:

1. A pressure swing adsorption process for the separation of a more readily adsorbable component of a feed gas mixture containing said component and a less readily adsorbable component in a cyclic adsorption/desorption sequence comprising:

(a) passing said feed gas mixture to a feed end of at least one adsorption vessel containing a bed of equilibrium-type adsorbent material at an upper adsorption pressure, said adsorbent material being capable of selectively adsorbing the more readily adsorbable component of said feed gas mixture, said adsorbent material being only a moderately strong adsorbent for said more readily adsorbable component and having a water loading of less than about 25 g water per kg., no externally supplied refrigeration being furnished to the bed of adsorbent material, said feed gas mixture passing through distributor means at the feed end of said adsorption vessel and a regenerator section positioned between the bed of adsorbent material and said distributor means, said regenerator section comprising conductive elements adapted to store refrigeration present in the back-flowing stream during the adsorption portion of the adsorption/desorption processing sequence carried out in said bed of adsorbent material, said adsorption vessel having insulation means on the walls thereof to prevent the loss of any appreciable amount of self-refrigeration generated during cyclic adsorption/desorption processing by introduction of heat from outside the adsorption vessel through the walls thereof to the bed of adsorbent material or to the regenerator section therein;

(b) withdrawing less readily adsorbable component from distributor means at the opposite end of the vessel at the upper adsorption pressure; and (c) removing the more readily adsorbable component of the feed gas mixture from the feed end of the bed with depressurization of the bed to the lower desorption pressure within the range of from about 0.4 to about 1.2 atmospheres, the upper adsorption pressure/lower desorption pressure ratio being in the range of from about 1.25/1 to about 5.0/1, whereby the combination of the use of said regenerator section to store self-refrigeration and the insulation of the adsorption vessel enables the retention of the internally generated self-refrigeration within the vessel, so that the average temperature of the adsorbent bed is reduced during cyclic adsorption/desorption operations without the need for externally supplied refrigeration.

2. The process of claim 1 in which said lower desorption pressure is from about 0.4 to about 0.7 atmospheres and said upper adsorption pressure/lower desorption pressure ratio is from about 1.4/1 to about 5.0/1.

3. The process of claim 2 in which said pressure ratio is from about 1.7/1 to about 3.0/1.

4. The process of claim 1 in which the lower desorption pressure is from about 1 to about 1.2 atmospheres and said upper adsorption pressure/lower desorption pressure ratio is from about 1.25/1 to about 3.5/1.

5. The process of claim 4 in which said pressure ratio is from about 1.4/1 to about 2.5/1.

6. The process of claim 1 in which said regenerator section contains particles having a thermal conductivity of from about 250 to about 0.5 BTU per °F./ft/ft²/hr.

7. The process of claim 6 in which said thermal conductivity is from about 150 to about 15.

8. The process of claim 1 in which said water loading is less than about 10 g water per kg.

9. The process of claim 1 in which said bed of adsorbent material comprises sodium X zeolite material having a silica/aluminum ratio of from about 2.0 to about 2.6.

10. The process of claim 9 in which said silica/aluminum ratio is less than 2.4.

11. The process of claim 1, in which said bed of adsorbent material comprises type 4A zeolite.

12. The process of claim 1 in which said bed of adsorbent material comprises type 5A zeolite.

13. The process of claim 1 in which the distributor means at the feed end of the adsorption vessel contains particles serving to appreciable decrease the void space therein.

14. The process of claim 1 and including passing said feed gas mixture through a drying section positioned within the adsorption vessel between said regenerator section and the bed of adsorbent material, said drying section comprising desiccant material capable of selectively adsorbing water vapor, carbon dioxide and heavy hydrocarbons from the feed gas mixture, the portion of the drying section in the vicinity of the bed of adsorbent material serving as a second regenerator section.

15. The process of claim 14 in which said lower desorption pressure is from about 0.4 to about 0.7 atmosphere and said upper adsorption pressure/lower desorption pressure ratio is from about 1.7/1 to about 3.0/1.

16. The process of claim 15 in which said regenerator section contains particles having a thermal conductivity of from about 250 to about 0.5 BTU per °F./ft/ft²/hr.

17. The process of claim 16 in which said thermal conductivity is from about 150 to about 15.

18. The process of claim 14 in which said lower desorption pressure is from about 1 to about 1.2 atmospheres and said upper adsorption pressure/lower desorption pressure ratio is from about 1.25/1 to about 3.5/1.

19. The process of claim 14 in which said water loading is less than about 10 g water per kg.

20. The process of claim 14 in which said bed of adsorbent material comprises sodium X zeolite material having a silica/aluminum ratio of from about 2.0 to about 2.6.

21. The process of claim 20 in which said silica/aluminum ratio is less than 2.4.

22. The process of claim 14 in which said bed of adsorbent material comprises type 4A zeolite.

23. The process of claim 14 in which said bed of adsorbent material comprises type 5A zeolite.

24. The process of claim 14 in which the distributor means at the feed end of the adsorption vessel contains particles serving to appreciably decrease the void space therein.

25. The process of claim 14 in which the feed gas mixture comprises air.

26. The process of claim 25 in which the less readily adsorbable component recovered from said opposite end of the bed comprises oxygen and argon product gas.

27. The process of claim 25 in which the more readily adsorbable component recovered from the feed end of the bed comprises nitrogen product gas.

28. The process of claim 14 in which the feed gas mixture comprises nitrogen as the more readily adsorbable component and helium as the less readily adsorbable component.

29. The process of claim 14 in which the feed gas mixture comprises nitrogen as the more readily adsorbable component and hydrogen as the less readily adsorbable component.

30. The process of claim 14 in which said feed gas mixture is passed, on a cyclic basis, to two or more adsorption vessels.

31. The process of claim 1 in which the feed gas mixture comprises air.

32. The process of claim 31 in which the less readily adsorbable component recovered from said opposite end of the bed comprises oxygen and argon product gas.

33. The process of claim 31 in which the more readily adsorbable component recovered from the feed end of the bed comprises nitrogen product gas.

34. The process of claim 1 in which the feed gas mixture comprises nitrogen as the more readily adsorbable component and helium as the less readily adsorbable component.

35. The process of claim 1 in which the feed gas mixture comprises nitrogen as the more readily adsorbable component and hydrogen as the less readily adsorbable component.

36. The process of claim 1 in which said feed gas mixture is passed, on a cyclic basis, to from two or more adsorption vessels.

37. A pressure swing adsorption system for the separation of more readily adsorbable component of a feed gas mixture containing said component and a less readily adsorbable component comprising:

(a) at least one adsorption vessel containing a bed of equilibrium-type adsorbent material capable of selectively adsorbing the more readily adsorbable component of said feed mixture, said adsorbent material being only a moderately strong adsorbent for said more readily adsorbable component and having a water loading of less than about 25 g water per kg., said bed of adsorbent material not having means for the furnishing of externally supplied refrigeration thereto;

(b) conduit means for passing the feed gas mixture to a feed end of the adsorption vessel and for removing the more readily adsorbable component therefrom upon desorption from the bed of adsorbent material;

(c) conduit means for withdrawing the less readily adsorbable component from an opposite end of the vessel;

(d) distributor means positioned at the feed end and at the opposite end of the adsorption vessel adjacent said conduit means, said adsorbent bed being positioned between said distributor means;

(e) a regenerator section within said adsorption vessel and positioned between the bed of adsorbent material and said distributor means positioned at the feed end of said adsorption vessel, said regenerator section comprising conductive elements adapted to store refrigeration present in the back-flowing stream during the desorption portion of the adsorption/desorption processing sequence carried out in the bed; and (f) insulation means on the walls of the adsorption vessel, said insulation means being adapted to prevent the loss of any appreciable amount of self-refrigeration generated during cyclic adsorption/desorption operation of the system by introduction of heat from outside the adsorption vessel through the walls thereof to the bed of adsorbent material or to the regenerator section within the vessel, whereby the combination of the regenerator section and the insulation of the adsorption vessel enables the retention of internally generated, self-refrigeration within the vessel, so that the average temperature of the adsorbent bed can be reduced during cyclic adsorption/desorption operations without the need for externally supplied refrigeration.

38. The system of claim 37 in which said bed of adsorbent material comprises sodium X zeolite material having a silica/alumina ratio of from about 2.0 to about 2.6.

39. The system of claim 38 in which said silica/alumina ratio is less than 2.4.

40. The system of claim 37 in which said bed of adsorbent material comprises 5A type zeolite.

41. The system of claim 37 in which said bed of adsorbent material comprises 4A type zeolite.

42. The system of claim 37 in which said regenerator section comprises metal particles.

43. The system of claim 37 in which said regenerator section comprises particles having a thermal conductivity within the range of from about 250 to about 0.5 BTU/°F./ft/ft$^2$/hr.

44. The system of claim 43 in which said thermal conductivity is from about 150 to about 15.

45. The system of claim 37 in which said water loading is less than about 10 g water per kg.

46. The system of claim 1 in which said system comprises two or more adsorption vessels containing said bed of adsorbent material, said conduit means for passing the feed gas mixture to, and for removing more readily adsorbable component from, the system, and said conduit means for withdrawing less readily adsorbable component from the system being adapted so as to enable adsorption/desorption pressure swing adsorption operations to be carried out on a cyclic basis in each bed.

47. The system of claim 37 in which the distributor means at the feed end of the adsorption vessel is filled with particles serving to appreciably decrease the void space therein.

48. The system of claim 47 in which said particles comprise conductive particles.

49. The system of claim 37 and including a drying section within said adsorption vessel and positioned between said regenerator section and the bed of adsorbent material, said drying section comprising desiccant material capable of removing water vapor, carbon dioxide and heavy hydrocarbons from the feed gas mixture, the portion of said drying section in the vicinity of said bed of adsorbent material serving as a second regeneration section.

50. The system of claim 49 in which said bed of adsorbent material comprises X zeolite material having a silica/alumina ratio of from about 2.0 to about 2.6.

51. The system of claim 50 in which said silica/alumina ratio is less than 2.4.

52. The system of claim 49 in which said bed of adsorbent material comprises 5A type zeolite.

53. The system of claim 49 in which said bed of absorbent material comprises 4A zeolite.

54. The system of claim 49 in which said regenerator section comprises metal particles.

55. The system of claim 49 in which said regenerator section comprises elements having a thermal conductivity within the range of from about 250 to about 0.5 BTU/°F./ft/ft$^2$/hr.

56. The system of claim 55 in which said conductivity is from about 150 to about 15.

57. The system of claim 49 in which said system comprises two or more adsorption vessels containing said bed of adsorbent material, said conductive means for passing the feed gas mixture to, and for removing more readily adsorbable component from, the system, and said conduit means for withdrawing less readily adsorbable component from the system being adapted so as to enable adsorption/desorption pressure swing adsorption operations to be carried out on a cyclic basis in each bed.

58. The system of claim 49 in which the distributor means at the feed end of the adsorption vessel is filled with particles serving to appreciable decrease the void space therein.

59. The system of claim 58 in which said particles comprise conductive particles.

* * * * *